United States Patent [19]
Yamaguchi

[11] Patent Number: 4,679,229
[45] Date of Patent: Jul. 7, 1987

[54] RINGING DETECTION CIRCUIT

[75] Inventor: Shingo Yamaguchi, Atsugi, Japan

[73] Assignee: Ricoh Company, Ltd., Tokyo, Japan

[21] Appl. No.: 848,141

[22] Filed: Apr. 4, 1986

[30] Foreign Application Priority Data

Apr. 15, 1985 [JP] Japan .................................. 60-78440

[51] Int. Cl.⁴ .......................................... H04M 1/00
[52] U.S. Cl. .................................. 379/373; 328/136;
328/138; 307/351
[58] Field of Search .............. 379/372, 373, 374, 375,
379/376; 307/351; 328/136, 138

[56] References Cited

U.S. PATENT DOCUMENTS

| | | | |
|---|---|---|---|
| 4,066,848 | 1/1978 | Darwood | 328/136 |
| 4,390,843 | 6/1983 | Betts et al. | 379/373 |
| 4,496,797 | 1/1985 | Price | 379/82 |

OTHER PUBLICATIONS

Harr, Peak Detector Comparator, Nov. 1974, vol. 17, No. 6.

Primary Examiner—Gene Z. Rubinson
Assistant Examiner—C. Champion
Attorney, Agent, or Firm—Oblon, Fisher, Spivak, McClelland & Maier

[57] ABSTRACT

A ringing detection circuit for accurately detecting a ringing having opposite polarities which arrive over a telephone subscriber's line. After the detection of the fact that the AC waveform of the ringing has reached a predetermined level in one of the polarities, variations in the waveform in that polarity are neglected until the waveform reaches a predetermined level in the other polarity. This allows a ringing to be detected with accuracy without responding to distortions of the ringing.

1 Claim, 4 Drawing Figures

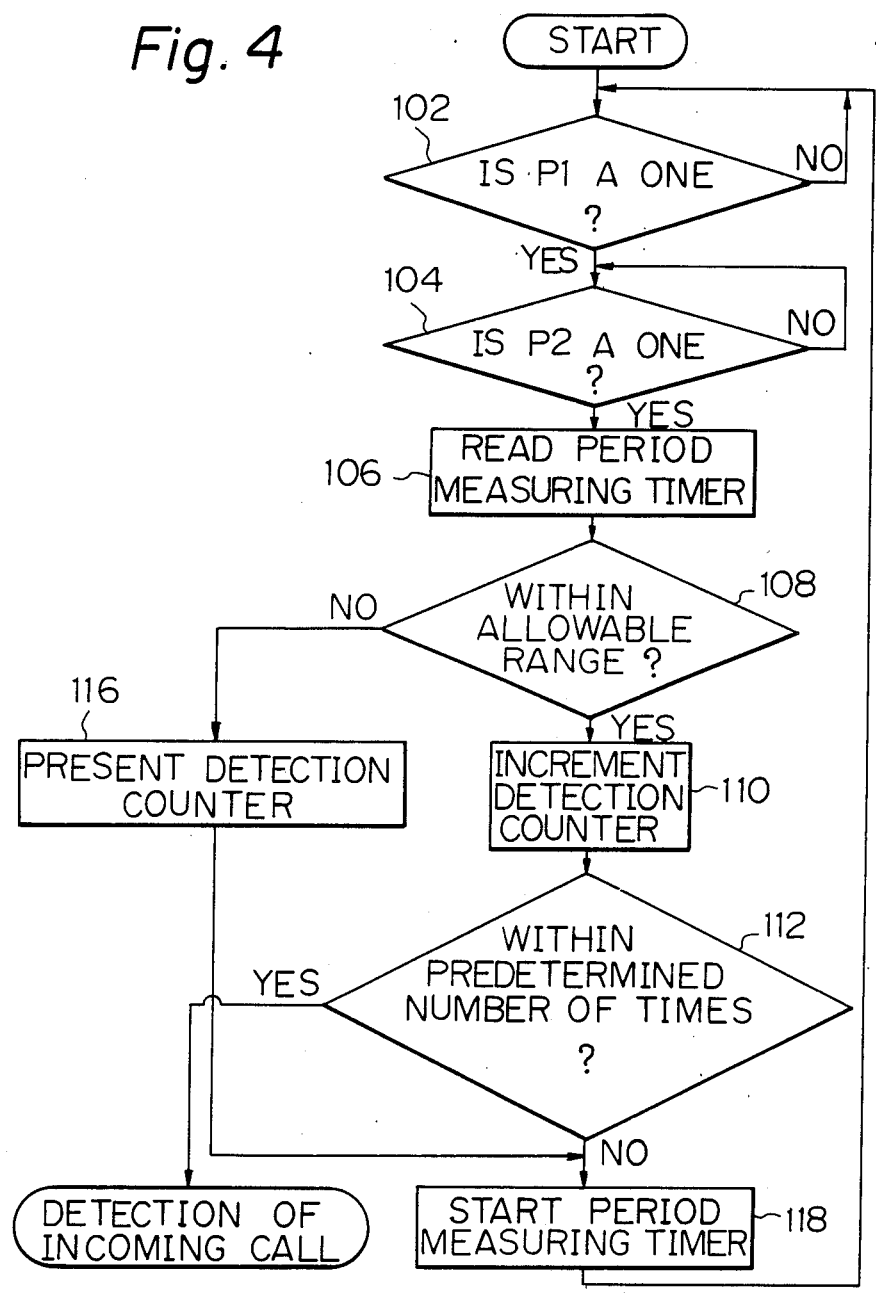

RINGING DETECTION CIRCUIT

BACKGROUND OF THE INVENTION

The present invention relates to a circuit for detecting a ringing which arrives over a telephone subscriber's line in order to identify reception of a call.

As well known in the art of telephones, a ringing, or calling signal, is implemented with an AC signal which intermittently appears over each predetermined duration and disappears over each predetermined duration. A network control device is adapted to automatically respond to reception of a call at a facsimile apparatus or like subscriber's apparatus which may be connected to a subscriber's line. A predominant type of network control device is constructed to decide that a call has been received by detecting the ringing. One of prior art ringing detection circuits includes a full-wave rectifier which is implemented with a diode bridge, and a threshold circuit which is implemented with a Zener diode, a photocoupler, etc. In such a prior art circuit, a ringing is full-wave rectified by the rectifier and then passed through the threshold circuit to detect voltages higher than a predetermined threshold level; the ringing is detected by measuring the period of those particular voltages.

Generally, a subscriber's line is apt to subject a ringing to various kinds of distortions depending upon various conditions of the line. In this situation, the problem with the above-described prior art ringing detection circuit is that both the positive and the negative polarities derived from full-wave rectification are applied to a single threshold circuit. Specifically, should a distortion greater than the threshold value be contained in the ringing, the output of the threshold circuit would fluctuate every time the signal varies over the threshold value, introducing errors in the period measurement. Stated another way, relatively high frequencies would be superposed as noise on the ringing and be measured to prevent the period of the ringing from being accurately measured. In this condition, an incoming call sometimes fails to be accurately detected despite that is has been adequately received.

To eliminate such measurement errors, an implementation has been proposed in which an integration circuit including a capacity is provided at the output of a photocoupler in such a manner as to remove a certain degree of noise component. This implementation is not fully satisfactory, however, because it is incapable of removing distortions having relatively long periods.

SUMMARY OF THE INVENTION

It is therefore an object of the present invention to eliminate the drawbacks inherent in the prior art circuits as discussed above and provide a ringing detection circuit capable of accurately detecting a ringing.

It is another object of the present invention to provide a generally improved ringing detection circuit.

A ringing detection circuit for detecting a ringing having opposite polarities which arrives over a telephone subscriber's line of the present invention comprises a first threshold detector connected to the subscriber's line for producing an output when detected that the ringing has exceeded a first threshold value in one of the polarities, a second threshold detector also connected to the subscriber's line for producing an output when detected that the ringing has exceeded a second threshold value in the other polarity, and an identification circuit responding to a variation of an output of one of the first and second threshold detectors and then to a variation of an output of the other threshold detector, so as to identify reception of the ringing on the basis of a repetition period of one of the variations.

In accordance with the present invention, a ringing detection circuit for accurately detecting a ringing having opposite polarities which arrive over a telephone subscriber's line is constructed such that after the detection of the fact that the AC waveform of the ringing has reached a predetermined level in one of the polarities, variations in the waveform in that polarity are neglected until the waveform reaches a predetermined level in the other polarity. This allows a ringing to be detected with accuracy without responding to distortions of the ringing.

The above and other objects, features and advantages of the present invention will become more apparent from the following detailed description taken with the accompanying drawings.

BRIEF DESCRIPTION OF THE DRAWINGS

FIG. 4 is a flowchart representative of operation of a processing unit which is included in the circuit of FIG. 3.

DESCRIPTION OF THE PREFERRED EMBODIMENTS

While the ringing detection circuit of the present invention is susceptible of numerous physical embodiments, depending upon the environment and requirements of use, substantial numbers of the herein shown and described embodiments have been made, tested and used, and all have performed in an eminently satisfactory manner.

Figure 1:
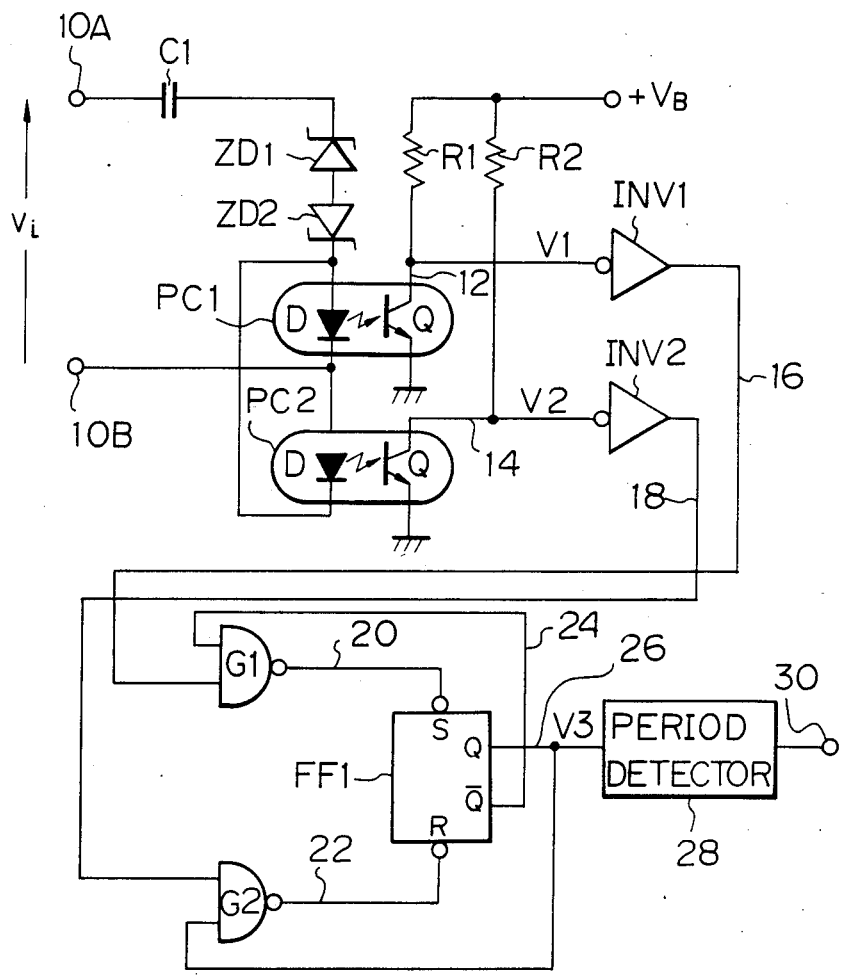
FIG. 1 is a schematic block diagram of a ringing signal detection circuit embodying the present invention.

Referring to FIG. 1, a ringing detection circuit in accordance with the present invention is shown. The circuit includes a series connection of a DC removing capacitor C1, Zener diodes ZD1 and ZD2, and photocouplers PC1 and PC2. This series connection is connected to terminals 10A and 20B which in turn are connected to a subscriber's line, or loop. As shown, the Zener diodes ZD1 and ZD2 are interconnected in an opposite relationship with respect to polarity. Connected to the terminals 10A and 10B are a telephone set or like subscriber's apparatus. A ringing vi from a central office arrives at, for example, the telephone. The ringing may comprise 16 Hz AC signals which continue one second each and are interpolated by intervals of two seconds.

Each of the photocouplers PC1 and PC2 comprises a diode D and a phototransistor Q which is optically connected to the diode D. The diodes D are connected to the subscriber's loop in an opposite polarity and parallel relationship. The photocouplers PC1 and PC2 fulfill the role of level-separating the logics of the circuit from the loop. At the same time, the two diodes D of the photocouplers PC1 and PC2 cooperate with the Zener diodes ZD1 and ZD2 to serve as a threshold detection circuit. In the photocoupler PC1, the emitter-collector path of the transistor Q is connected to a power supply +VB via a resistor R1 and to ground, while the collector 12 is connected to an input of an inverter INV1. Likewise, in the other photocoupler PC2, the emitter-collector path is connected to the power supply +VB via a resistor R2 and to ground, while the collector 14 is connected to an input of an inverter INV2.

The output 16 of the inverter INV1 is connected to one input of a NAND gate G1 and, in the same manner, the output 18 of the inverter INV2 is connected to one input of a NAND gate G2. The output 20 of the NAND gate G1 is connected to a set input S of a flip-flop, or two-state circuit, FF1, and the output 22 of the NAND gate G2 to a reset input R of the flip-flop FF1. The $\overline{Q}$ output of the flip-flop FF1 is connected to the other input 24 of the NAND gate G1, and the Q output 26 to an input of a period detector 28 and the other input of the NAND gate G2. The period detector 28 comprises a counter adapted to measure the period of a signal which is applied to its input 26. When the measured period lies within an allowable range of a period which is predetermined as a ringing, a signal indicative of detection of an incoming call appears at an output 30 of the period detector 28. Alternatively, the period detector 28 may be implemented with a frequency counter which measures not the period but the frequency of the signal arriving at the input 26.

Figure 2:
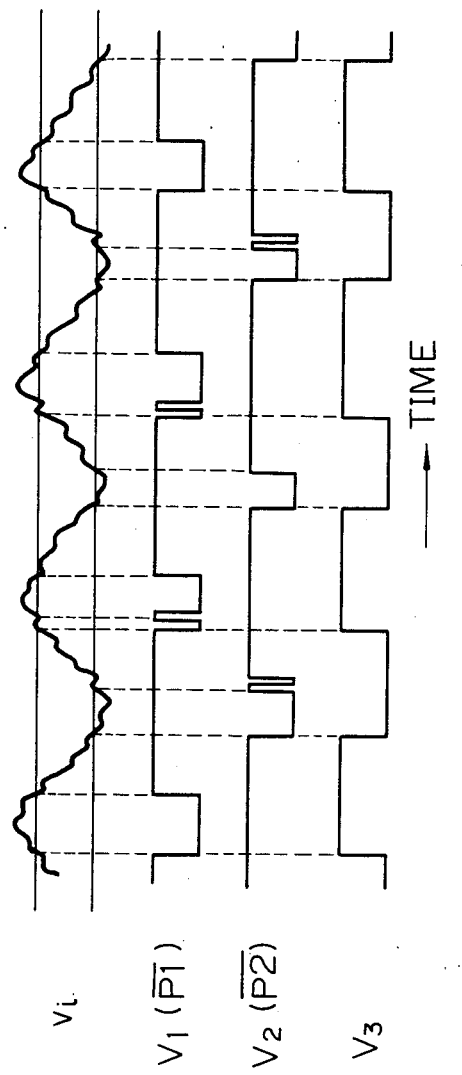
FIG. 2 shows waveforms of signals which appear in various sections of the circuit of FIG. 1.

The operation of the circuit of FIG. 1 will be described with reference also made to FIG. 2. The AC voltage vi of the ringing is applied to the Zener diodes ZD1 and ZD2 via the capacitor C1. Portions of the AC voltage vi of the ringing which are higher than a threshold voltage of the Zener diode ZD1 or ZD2 cause a current to flow through the photocoupler PC1 or PC2 according to the direction of current thereof. As the current through the photocoupler PC1 or PC2 exceeds a conduction threshold of the associated transistor Q, the transistor Q becomes conductive with the result that the collector voltage V1 or V2 of the conductive transistor Q goes low. The low level voltage V1 or V2 is applied to the inverter INV1 or INV2 and, as a high level, energizes one input of the gate G1 or G2.

It will be seen from the above that the photocoupler PC1 detects an AC current of one polarity and the photocoupler PC1, an AC current of the other polarity. Hence, the output signals 16 and 18 of the inverters INV1 and INV2 are opposite in polarity to each other.

While the flip-flop FF1 is reset, the input 24 of the gate G1 remains energized. When the output signal 16 of the inverter G1 goes high, that is, when the photocoupler PC1 has been driven, the output 20 of the gate G1 becomes high level to set the flip-flop FF1. On the other hand, while the flip-flop FF1 is set, the input 26 of the gate G2 remains energized; in this condition, as the output signal 18 of the inverter INV2 becomes high level, that is, when the photocoupler PC2 has been driven, the output 22 of the gate G2 goes high to reset the flip-flop FF1.

As will be apparent from the above, so long as the flip-flop FF1 is reset, the input 26 of the gate G2 is kept deenergized so that even if the output signal 18 of the inverter, INV2 goes high, that is, even if the photocoupler PC2 is driven, the output 22 of the gate G2 remains low maintaining the flip-flop FF1 in a reset state. Likewise, while the flip-flop FF1 is set, the input 24 of the gate G1 remains deenergized so that even if the output signal 16 of the inverter INV1 goes high, that is, even if the photocoupler PC1 is driven, the output 20 of the gate G1 remains low keeping the flip-flop FF1 in a set state. Stated another way, once set, the flip-flop FF1 will not be reset unless the photocoupler PC2 is driven. Also, once reset, the flip-flop FF1 will not be set unless the photocoupler PC1 is driven. The flip-flop, FF1, therefore, does not respond to chatter-like cracks which may occur in the signal V1 or V2 due to distortions of the ringing vi, as represented by the signals V1 and V2 in FIG. 2. In this condition, the flip-flop FF1 is allowed to produce at its output 26 a signal having a rectangular wave V3 which substantially corresponds to the period of the ringing vi. In short, the flip-flop FF1 reverses its state only when the ringing has exceeded the positive and the negative thresholds alternately.

Consequently, the period detector 28 is capable of accurately counting the period of the ringing vi based on the rectangular signal V3 and, therefore, identifying an incoming call over the subscriber's line. The resultant call identification signal is delivered to the output 30 of the period detector 28.

Figure 3:
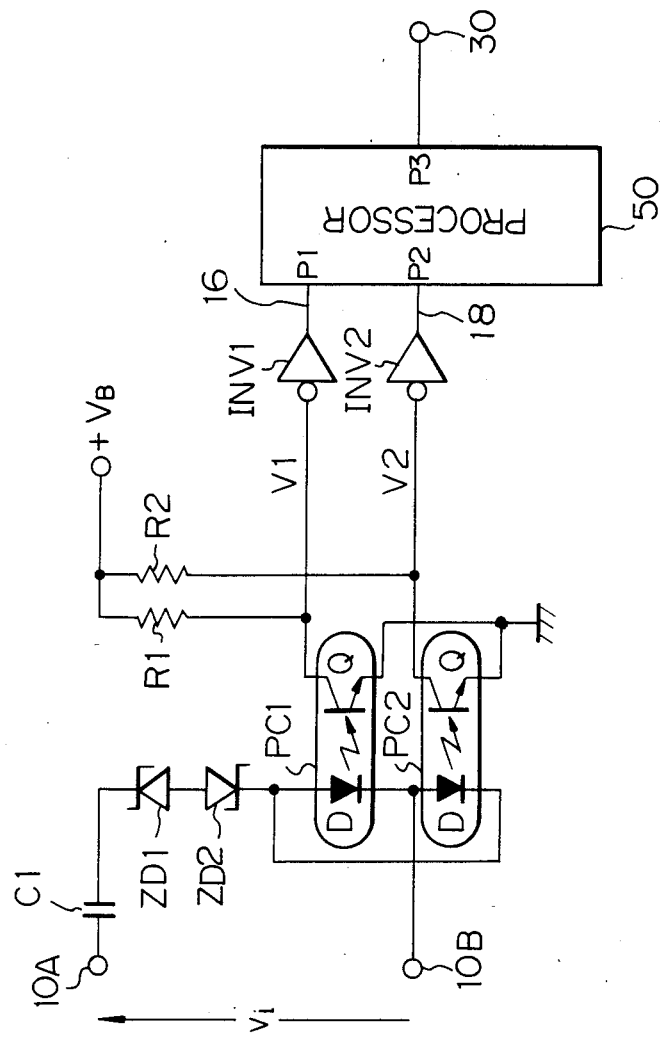
FIG. 3 is a block diagram similar to FIG. 1, showing another embodiment of the present invention.

In this illustrative embodiment of FIG. 1, the gates G1 and G2, the flip-flop FF1 and the period detector 28 may be implemented with a microprocessor or similar processing unit, for example. Another embodiment of the present invention which includes such an alternative implementation is shown in FIG. 3. In FIG. 3, the same or similar structural elements as those of FIG. 1 are designated by like reference numerals to avoid redundancy of description.

Referring to FIG. 3, a processing unit, or processor, 50 has input ports P1 and P2 which respectively are connected to the outputs 16 and 18 of the inverters INV1 and INV2. The processor 50 has another input port P3 which is connected to the output port 30 of the ringing detection circuit. The processor 50 may desirably be implemented with a microprocessor or like processor system. In this particular embodiment, the processor 50 executes an operation flow such as shown in FIG. 4.

First, the processor 50 scans the states of the input ports P1 and P2 (STEPS 102 and 104). As the input P1 becomes significant such as high level, or a ONE, the processor 50 waits until the input P2 becomes a ONE. As soon as the input P2 becomes a ONE, the processor 50 reads a count then existing in a period counting timer (STEP 106). If the count lies within a predetermined allowable range (STEP 108), the processor 50 increments the counter (STEP 110). At the instant when the counter has reached a predetermined value (STEP 112), that is, when a period has been detected a predetermined number of times, the processor 50 produces a call identification signal determining that a ringing vi of predetermined rate has been detected. If the count of the counter is sort of the predetermined value (STEP 112), the processor 50 triggers the timer again (STEP 118) and then returns to the STEP 102 in order to continue the measurement. If the count does not lie in the allowable range as decided at the STEP 108, the processor 50 resets the counter (STEP 116) and then jumps to the STEP 118.

It will be understood from the illustrative flow that the processor 50, using the period measuring timer, counts the interval during which occurs a sequence of events: the input P2 becomes a ONE, then the input P1 becomes a ONE, and then the input P2 becomes a ONE again. If the resultant count does not lie in the allowable range, the processor 50 resets the counter and then repeats measurement. This implies that the chatter-like cracks occurring in the signal V1 or V2 due to distortions of the ringing are neglected. It will be needless to mention that the processor 50 may scan the input P2 at the STEP 102 and the input P1 at the STEP 104. In this manner, the timer adapted for period detection is operated in a distortion-free condition and detection is effected a predetermined number of times, so that the period of a ringing may be counted with accuracy.

In summary, it will be seen that in accordance with the present invention after the detection of the fact that the AC waveform of a ringing has reached a predetermined level in one polarity, any variation of the waveform in that polarity is neglected until the waveform reaches a predetermined level in the other polarity. This makes it possible to correctly detect a ringing without responding to distortions of the ringing. Hence, a ringing detection circuit of the present invention is effectively applicable to the detection of ringing such as in a network control device.

Various modifications will become possible for those skilled in the art after receiving the teachings of the present disclosure without departing from the scope thereof.

What is claimed is:

1. A ringing detection circuit for detecting a ringing having opposite polarities which arrives over a telephone subscriber's line, comprising:

first threshold detector means connected to the subscriber's line for producing an output when detected that the ringing has exceeded a first threshold value in one of the polarities;

second threshold detector means also connected to the subscriber's line for producing an output when detected that the ringing has exceeded a second threshold value in the other polarity; and identification means responding to a variation of an output of one of said first and said second threshold detector means and then to a variation of an output of the other threshold detector means, so as to identify reception of the ringing on the basis of a repetition period of one of the variations.

* * * * *